Dec. 4, 1956 G. A. NELSON 2,772,860
VESSEL WITH CONTINUOUS HELICAL LINER
Filed July 28, 1953
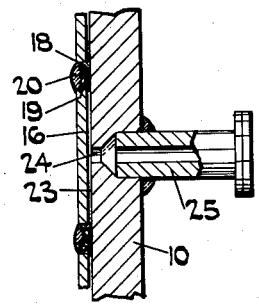
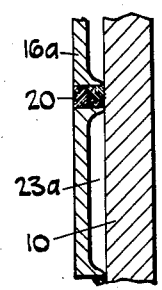
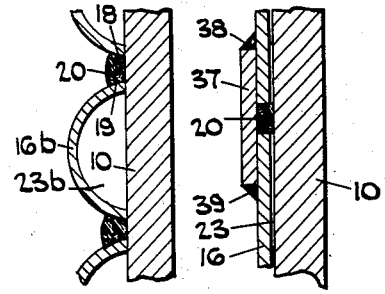
FIGURE 2    FIGURE 3    FIGURE 4    FIGURE 5
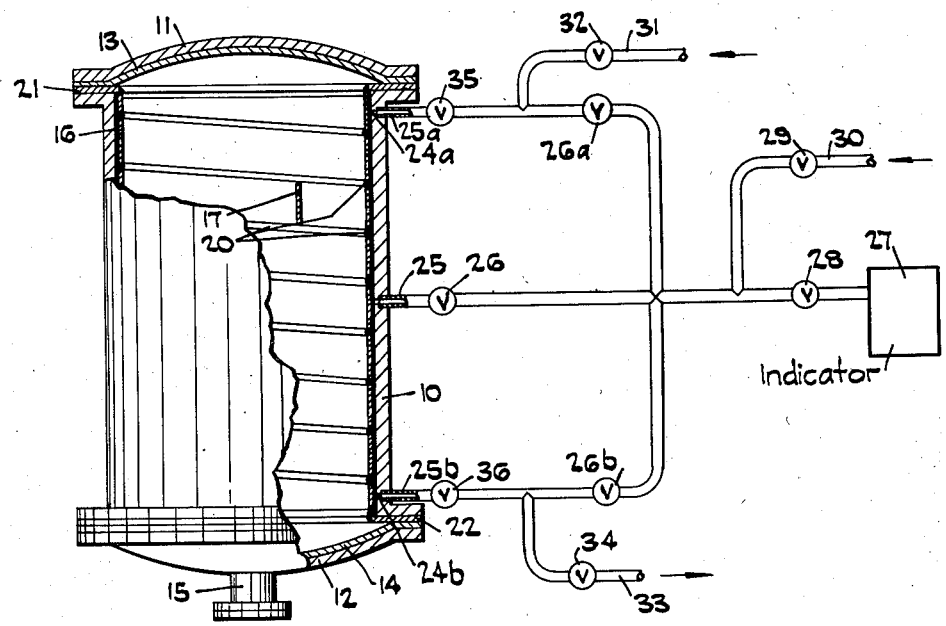
FIGURE 1
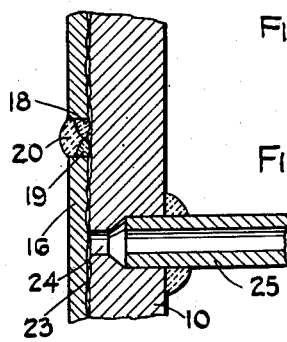
FIGURE 6
Inventor:
George A. Nelson
By Oswald H. Milmore
His Attorney United States Patent Office 2,772,860
Patented Dec. 4, 1956

2,772,860

VESSEL WITH CONTINUOUS HELICAL LINER

George A. Nelson, Berkeley, Calif., assignor to Shell Development Company, Emeryville, Calif., a corporation of Delaware Application July 28, 1953, Serial No. 370,741

2 Claims. (Cl. 257—208)

This invention relates to the art of lining metal vessels, such as tanks, pressure vessels or kettles, chemical reactors, heat exchangers, pipes, etc., which are intended for use with aggressive fluids and/or for use at elevated temperatures. More particularly, the invention relates to a new arrangement of the lining material within a vessel to protect the walls thereof from attack by fluids and/or to form a flow space that may be used for the circulation of a thermal fluid for heating or cooling the contents of the vessel or for other purposes.

Vessels having walls in contact with aggressive media are frequently applied in chemical engineering, for example, as vessels in which chemical reactions occur between liquids and/or gases at elevated temperatures and/or pressures. Considerations of strength or economy or both necessitate that such vessels be constructed with an outer wall or shell made of base metal such as iron or steel that is internally covered with a corrosion-resistant lining, the composition of which is selected in accordance with the intended service and may, for example, be a metal such as silver or platinum or an alloy such as aluminum bronze, chrome-nickel, etc.

Various arrangements for mounting such linings have been used. (See, for example, an article "New techniques for lining vessels for protection against corrosion" by G. C. Carpenter in "Petroleum Processing," January 1950, pp. 21–24 and U. S. patent to Probst, No. 2,631,015.) The helically laid, shingled lining according to the Probst patent, while excellent in that it permits the lining to be formed from a single, continuous band without special cutting to sizes and shapes, provides an ample helical passageway between the lining and vessel wall for pressurizing or circulation of a thermal fluid, and in that it simplifies welding and makes it possible to produce a high quality weld because only similar metals are welded together at the finished surface, does present certain difficulties in the physical handling of the band of lining material during installation and requires that the said helical passageway be pressurized to avoid deformation of the lining when the vessel contains fluids at a high pressure, particularly when the lining is to be made of thin material, e. g., silver having a thickness such as 0.02 inch.

It is an object of this invention to provide an improved lining for vessels wherein some or all of the advantages of a helical placement of a band of lining against the vessel wall are retained and the handling of the band is simplified.

A specific object, attained in certain embodiments of this invention, is to mount the helical band of lining so that the necessity for pressurizing of the helical passageway is obviated although thin lining material is used and the vessel is subjected to considerable pressure.

In summary, according to the instant invention, a cylindrical vessel of suitable structural characteristics is lined with a continuous strip or band of corrosion-resistant metal laid helically with both margins thereof in engagement with the vessel wall and with adjoining turns spaced apart to leave a helical gap, both margins of the lining strip being secured to the vessel wall by welding, the helical area of the vessel wall exposed to the said gap being suitably protected by the weldment and/or by a second lining strip of corrosion-resistant lining spanning the gap and overlying the adjoining turns of the first lining strip and welded thereto. The intermediate part of the strip may be in engagement with the vessel wall but provides a helical passageway between itself and the vessel wall due to naturally occurring or deliberately applied surface irregularities and this passageway can communicate with the outside through one or more holes extending through the vessel wall. When the said strip is a flat band the passageway will be thin and supported throughout its area by the vessel wall; in this case the passageway will have very small dimensions, suitable only for the seepage of fluid under pressure. However, according to another embodiment, the strip can be hollowed out intermediate the margins thereof, e. g., it can have the cross sectional shape of a structural channel beam or be substantially arcuate, to provide a larger passageway suitable for the circulation of a thermal fluid.

Having indicated the general nature of the invention, reference is made to the accompanying drawings forming a part of this specification and showing certain preferred embodiments of the invention by way of illustration, wherein:

Figure 1 is an elevation view, partly in section, of a vessel lined in accordance wtih the invention;

Figure 2 is an enlarged section view showing a portion of the vessel wall and lining;

Figures 3, 4 and 5 are views similar to Figure 2 showing three alternate constructions; and Figure 6 shows a portion of the sectional view of Figure 2 further enlarged to show the irregularities or roughness in the surfaces of lining strip and vessel wall which form the helical passageway between the strip and the vessel wall previously referred to and described in more detail hereinafter.

Referring to the drawings in detail, and particularly to Figures 1 and 2, there is shown a metal vessel, such as a pressure vessel, having an outer peripheral shell 10 which may have a cylindrical shape and be formed of a large steel tube or built up of a number of steel plates that are suitably welded or riveted together so as to provide a relatively continuous inner surface suitable for welding. The shell has top and bottom closures 11 and 12, lined with corrosion-resistant linings 13 and 14, respectively. Suitable conduits, such as the conduit 15, may be fitted to one or both of these closures. The specific arrangement of the closures, their linings and conduits forms no part of the invention, and the invention is applicable to vessels with integral end closures.

The novel lining comprises a continuous strip or band 16 of corrosion-resistant metal alloy resistant to the fluids to be handled in the vessel, that is laid helically in a plurality of spaced turns starting at one end of the shell, e. g., at the bottom. Such lining material may be supplied on drums in long pieces sufficient to make many turns about the pressure shell; when the length is insufficient for this purpose two or more pieces may be butt-welded as shown at 17, preferably prior to introduction into the shell or after such introduction, precaution being advantageously taken in the latter case to isolate or otherwise protect the liner from the shell to prevent pick-up of iron from the shell wall.

The lining strip according to Figures 1 and 2 is a flat strip. In placing the lining, the band is laid flat against the inner surface of the vessel wall with a slight pitch so that the free end of the band extends toward the starting end of the helix and the trailing edge of the band extends beyond the end of the shell entirely around the shell to leave a gradually widening overhanging part that, when laid flat, would have a substantially triangular outline. The other edge of the band, which is away from the starting end of the helix is herein referred to as the leading edge. Both edges of the band are laid continuously directly against the inner face of the shell, the pitch being such that the trailing edge of each turn is spaced from the leading edge of the preceding turn so as to leave a helical gap of width suitable to permit welding of both edges to the vessel wall. By way of example, the band may be three to twelve inches wide and the gap may be one-half inch wide, although these dimensions are not restrictive of the scope of the invention. The narrower bands are preferred for high temperature vessels. The welding is advantageously carried on contemporaneously with the laying of the band, e. g., simultaneously or alternately by laying one turn or a fraction thereof and welding it before resuming the laying. The welding that is done contemporaneously with the laying may be continuous along both edges; however, it is also possible to tack weld one or both edges only at intervals and then apply a continuous fillet weld to each edge after the entire band has been emplaced. When the lining band has been secured to the vessel the overhanging parts at both ends are trimmed, although at least the starting end of the band may be cut to a bias prior to starting the laying. It is evident that the winding may be continued to cover an end closure.

As is shown more particularly in Figure 2, the weldment includes a pair of fillet welds 18 and 19, that are preferably contiguous, e. g., overlapping, so as to cover completely the helical area of the vessel wall that is initially exposed to the gap. These weldments are preferably protected by a third weldment 20 placed over the first two, of sufficient width to span the gap and thereby completely cover the first two. It is evident that the first two weldments will in many cases contain traces of base metal picked up from the vessel wall which reduce the corrosion-resistant characteristics of the weldments, and that the third weldment will be free from or contain only negligible amounts of such base metal. It is evident that the third weldment is necessary when the first two weldments are not contiguous, since it is necessary that the vessel wall be protected by at least one weldment. At least the exposed weldment and, preferably, all weldments are of corrosion-resistant metal that is compatible with the lining metal.

The lined heads 11 and 12 may be attached to the lined shell in any suitable manner. For example, annular sheets of the same corrosion-resistant material, shown at 21 and 22, may be welded to the trimmed ends of the helical lining band to extend the lining over the ends of the shell 10, where it is engaged by the linings 13 and 14 of the end closures; however, other end sealing and lining arrangements may be used.

It will be noted that since only the two margins of the band are welded to the vessel wall, the intermediate portion of the band is not sealed to the wall but is spaced therefrom due to the slight irregularities or roughness in one or both of the contiguous surfaces. This provides a helical passageway 23 that extends continuously between the ends of the vessel and is closed at the ends. In some cases it may be desirable to roughen one or both contiguous surfaces. Although it is of only slight thickness it is possible for fluids, particularly gas under pressure, to seep through it and effect equalization of fluid pressure throughout different parts of the passageway; yet it affords structural support for the intermediate area of the band, whereby deflection of the lining is resisted despite the absence of any fluid pressure in the passageway 23. One or more holes 24 are cut through the pressure shell; they may be small weep holes or tell-tale holes when the passageway 23 is to be used only for a pressure fluid to detect leaks; however, when the passageway 23 is to be used for the circulation of a fluid, as described for Figures 3 and 4, larger holes may be desirable Considering first the use of the passageway for the former purpose, the hole 24 is connected to a pipe 25 which is, in turn, connected through an optional valve 26 to an indicating instrument 27 of any suitable type, such as a flow indicator, a pressure gauge, etc., which may be isolated by a valve 28. Pipe 25 is further connected by a normally closed valve 29 to a supply conduit 30 that is connected to a source of non-corrosive pressure fluid, not shown.

During operation, valves 26 and 28 are open, and valve 29 may be closed. In the event that a leakage opening occurs in the helical lining, at either the band or weldment thereof, and assuming that the pressure in the vessel exceeds that maintained in the helical passageway 23, fluid from the interior of the vessel flows through such leakage opening into the passageway and displaces naturally occurring or special inert fluid therein through the hole 24 and pipe 25 to give an indication in the indicating instrument 27. To counteract the leakage, pressure fluid may then be supplied by opening valve 29; the valve 28 may, if desired, be then closed. This fluid may be admitted at a pressure in excess of that of the fluid contents of the vessel, so as to enter the vessel through the leakage opening in the lining and thereby prevent additional amounts of corrosive fluid from flowing outwardly through the opening. The pressure fluid may be any inert fluid; it is advantageous to use as the pressure fluid a substance having the composition of one of the reactants or of a diluent that is already present in the vessel, so as not to contaminate the contents of the vessel, the non-corrosive or least corrosive reactant being of course selected for this purpose. It is thereby possible to maintain the vessel in operation for some time after a failure of the lining occurs. It is also possible to operate the vessel by maintaining within the passageway 23 and the associated pipes leading to the indicator a quantity of fluid at a pressure higher than that of the contents of the vessel and to detect the occurrence of a leak by a drop in the pressure as shown by the indicator 27. Moreover, I may also omit the instrument 27 and maintain non-corrosive fluid under pressure from the conduit 30 behind the lining at all times that the vessel is in operation by keeping the valve 29 open.

Although a single tell-tale hole 24 is theoretically sufficient, it may be desirable to provide a few additional holes, particularly in larger vessels, to guard against the possibility that the passageway 23 may become clogged by the flow of reacting mixture or by reaction, e. g., polymerization, of the non-corrosive fluid. Thus, additional tell-tale holes 24a and 24b may be provided at or near the upper and lower ends of the liner and connected to the pipe 25 through the pipes 25a and 25b, respectively, shown in Figure 1; valves 26a and 26b permit the isolation of these tell-tale holes.

In certain cases it is desirable to modify the arrangement of the piping shown in Figure 1 by adding thereto a supply conduit 31 connected to the pipe 25a through a valve 32 and a discharge conduit 33 connected to the pipe 25b through a valve 34. Normally open valves 35 and 36 are placed in the conduits 25a and 25b. During normal operation of the vessel, the valves 32 and 34 are closed and at least one of the valves 26, 26a and 26b, or all of them, are open to indicate a pressure build-up in the instrument 27 or to feed pressure fluid from the conduit 30. To purge the helical passageway 23 the valves 26, 26a and 26b are closed, valves 32 and 34 are opened, and purge fluid is forced under pressure from the conduit 30 through the entire helical passageway to the conduit 33, thereby restoring the access opening or helical passageway behind the liner to its original condition. It is evident that the sections of the helical passageway can be purged one at a time. Thus, by closing valves 28 and 36 and opening valves 26 and 26b the purge fluid enters the passageway through the hole 24a and discharges through hole 24 and the upper half of the passageway is purged; subsequently, the lower half is purged by closing valves 26b and 35 and opening valves 26a and 36.

According to a variant shown in Figure 3, the lining strip 16a is hollowed out intermediate the margins thereof, e. g., by forming it with the cross sectional shape shown, which corresponds to that of a structural channel. In this embodiment the helical passageway 23a is considerably thicker (measured perpendicularly to the surface of the vessel wall) and is better suited to transmitting a fluid, such as a thermal fluid for heating or cooling the contents of the vessel by heat transfer through the thin lining; such fluid may, in some cases, be one of the reactants itself, which is thereby preheated while cooling the vessel wall and thereby permitting the latter to be stressed to higher tension than would be possible without cooling. The details of the weldment are as previously described for Figure 2.

When the helical passageway is to be used for the circulation of a thermal fluid or for one of the reactants, valves 32, 35, 36 and 34 of Figure 1 are kept open during the operation of the vessel and all other valves are kept closed or the pipes associated with such other valves may be omitted. The fluid is then circulated, either downwardly from the pipe 31 through the passageway 23a and out through the pipe 33, or in the opposite direction. It is evident that, by means of the valves 26a, 26b and the pipe 25, and by opening the valve 26, the fluid may be circulated through only a part of the helical passageway.

According to a further variant shown in Figure 4, the lining strip 16b has an arcuate cross sectional shape, affording an ample helical passageway 23b. The weldment is as described above. This embodiment has the advantage that the lining is better able to undergo thermal expansion and contraction and the consequent deformation without rupturing the lining or the weldment. Also, this construction permits the lining to be loaded from the convex side by pressures within the vessel that greatly exceed the pressure within the passageway 23b; this follows from the inherent capability of an arc to resist stress more effectively than a flat member. It should be understood that a true arc is not essential but that variants thereof, as well understood in engineering practice, may be used. It will be understood that in the embodiment of Figure 3 it is desirable to pressurize the helical passageways 23a or 23b, particularly when very thin lining metal is used, to a pressure close to that prevailing within the vessel, in distinction to the other embodiments described herein, wherein pressurizing is optional and need be applied only when a leak test is being made or a leak is being counteracted by the introduction of an inert fluid. Pressurizing may, of course, also be practiced with the embodiment of Figure 4. It may be noted that the constructions according to Figures 3 and 4 are useful for controlling the temperature of the shell and/or the contents of the vessel even when the latter are non-corrosive; in this case it is not essential that the weldments be corrosion-resistant or that the entire arc of the shell wall exposed to the helical gap be covered by weld metal.

Referring to Figure 5, there is shown a construction in which the lining strip is a flat band 16 installed as described for Figure 2, but the third weldment 20 is in this instance ground flush with the outer surface of the said lining band; this weldment may, if desired, be omitted. A separate band 37 of lining material, which may be of the same material and thickness as the band 16, having sufficient width to span the gap between the turns of the band 16, is placed over the said gap so as to extend helically for the full height of the vessel. This band is welded to the first band along both margins by fillet welds 38 and 39. In this arrangement the last two welds are made entirely away from the base metal of the shell and all chance for contamination of the weld by pickup of base metal is avoided, resulting in a lining that is fully corrosion-resistant. It is evident that this construction is also applicable to the strips 16a and 16b of Figures 3 and 4.

I claim as my invention:

1. A metallic vessel having a lining formed of a strip of flat protective metal laid helically against the inner surface of the vessel in a plurality of spaced turns so as to leave a helical gap between adjoining turns, the inner surface of said strip being in engagement with said surface of the vessel across the full width of the strip and at least one of the said surfaces being rough to provide a continuous helical passageway between the strip and the vessel, a protective metal covering in said helical gap and including a continuous weldment within said gap connecting each edge of the said strip to the vessel, and at least one hole through the wall of the vessel communicating with the said helical passageway.

2. A lined vessel according to claim 1 wherein at least two of said holes through the vessel wall have conduit means connected thereto for admission of a fluid through one of said holes and discharge of said fluid through another of said holes after flow through the intervening part of the said helical passageway.

References Cited in the file of this patent

UNITED STATES PATENTS

| | | |
|---|---|---|
| 665,349 | Sewall | Jan. 1, 1901 |
| 1,160,217 | Valerius | Nov. 16, 1915 |
| 1,453,284 | Robe | May 1, 1923 |
| 2,158,799 | Larson | May 16, 1939 |
| 2,209,290 | Watts | July 23, 1940 |
| 2,631,015 | Probst | Mar. 10, 1953 |

FOREIGN PATENTS

| | | |
|---|---|---|
| 567,443 | Germany | Sept. 30, 1930 |